US010728529B2

(12) United States Patent
Ravirala et al.

(10) Patent No.: US 10,728,529 B2
(45) Date of Patent: Jul. 28, 2020

(54) SYNCHRONIZATION OF FRAME CAPTURES FROM MULTIPLE CAMERAS WITH DIFFERENT FIELDS OF CAPTURE

(71) Applicant: QUALCOMM Incorporated, San Diego, CA (US)

(72) Inventors: Narayana Karthik Ravirala, San Diego, CA (US); Jiafu Luo, Irvine, CA (US); Shizhong Liu, San Diego, CA (US); Karthikeyan Shanmugavadivelu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 16/123,561

(22) Filed: Sep. 6, 2018

(65) Prior Publication Data
US 2020/0084432 A1   Mar. 12, 2020

(51) Int. Cl.
*H04N 5/04* (2006.01)
*H04N 13/296* (2018.01)
*H04N 5/353* (2011.01)
*H04N 13/239* (2018.01)

(52) U.S. Cl.
CPC ......... *H04N 13/296* (2018.05); *H04N 5/3532* (2013.01); *H04N 13/239* (2018.05)

(58) Field of Classification Search
CPC .. H04N 13/296; H04N 5/3532; H04N 13/239; H04N 5/04
See application file for complete search history.

(56) References Cited

U.S. PATENT DOCUMENTS

| 8,941,706 | B2 | 1/2015 | Guo et al. |
| 9,792,709 | B1 | 10/2017 | Meler |
| 2010/0128110 | A1* | 5/2010 | Mavromatis ..... G08B 13/19641 348/47 |
| 2010/0302364 | A1* | 12/2010 | Kim ................... G01B 11/2531 348/136 |
| 2014/0092289 | A1* | 4/2014 | Takahashi ............ H04N 5/3532 348/308 |
| 2015/0279330 | A1 | 10/2015 | Kolarov et al. |
| 2017/0230585 | A1 | 8/2017 | Nash et al. |
| 2018/0025235 | A1 | 1/2018 | Fridman |
| 2018/0191940 | A1* | 7/2018 | Wu ........................ H04N 7/181 |
| 2019/0068842 | A1* | 2/2019 | Sheikh ..................... H04N 5/04 |
| 2019/0287024 | A1* | 9/2019 | Briggs ................. G06N 3/0454 |

* cited by examiner

*Primary Examiner* — Howard D Brown, Jr.
(74) *Attorney, Agent, or Firm* — Paradice and Li LLP

(57) ABSTRACT

Systems and methods for synchronizing frame captures for cameras with different fields of capture are described. An example device includes a first camera and second camera. The first camera includes a first camera sensor and a first rolling shutter. The first camera is configured to prevent scanning pixels from a first row to a row n of the first camera sensor and configured to begin sequentially scanning pixels of the row n of the first camera sensor. The second camera includes a second camera sensor and a second rolling shutter. The second camera is configured to begin sequentially scanning pixels of a first row of the second camera sensor concurrently with beginning to sequentially scan pixels of the row n of the first camera sensor. The first row of the second camera sensor corresponds to a row within a predefined number of rows after the first camera sensor's row n.

27 Claims, 7 Drawing Sheets

SYNCHRONIZATION OF FRAME CAPTURES FROM MULTIPLE CAMERAS WITH DIFFERENT FIELDS OF CAPTURE

TECHNICAL FIELD

This disclosure relates generally to image capture systems and devices, including synchronizing frame captures from multiple cameras with different fields of capture.

BACKGROUND

Many devices and systems may include or control multiple cameras to capture frames of a scene. Some imaging applications may use more than one camera. Such applications may be for, e.g., stereoscopic vision, depth mapping, virtual reality or augmented reality, security surveillance, or other applications that utilize corresponding frames from different cameras. For example, three-dimensional (3D) imaging applications may use two or more cameras of a multiple camera system to capture corresponding image frames. The corresponding image frames may be used to produce a 3D image (such as a side by side composite image including a first image to be viewed by a user's left eye and a second image to be viewed by a user's right eye).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for synchronizing frame captures from multiple cameras with different fields of capture. In some example implementations, an example device may include a first camera and a second camera. The first camera may have a first field of capture and include a first camera sensor and a first rolling shutter for sequentially scanning pixels of the first camera sensor. The first camera may be configured to prevent scanning pixels from a first row to a row n of the first camera sensor (n is an integer greater than 1). The first camera also may be configured to begin sequentially scanning pixels of the row n of the first camera sensor. The second camera may have a second field of capture different than the first field of capture, and the second camera may include a second camera sensor and a second rolling shutter for sequentially scanning pixels of the second camera sensor. The second camera may be configured to begin sequentially scanning pixels of a first row of the second camera sensor concurrently with beginning to sequentially scan pixels of the row n of the first camera sensor. The first row of the second camera sensor corresponds to a row within a predefined number of rows after the row n of the first camera sensor.

In another example, a method is disclosed. The example method includes, for a first camera including a first camera sensor and a first rolling shutter for sequentially scanning pixels of the first camera sensor, preventing scanning pixels from a first row to a row n of the first camera sensor (n is an integer greater than 1), begin sequentially scanning pixels of the row n of the first camera sensor, and begin sequentially scanning pixels of a first row of a second camera sensor of a second camera concurrently with beginning to sequentially scan pixels of the row n of the first camera sensor. The second camera includes a rolling shutter for sequentially scanning pixels of the second camera sensor and the first row of the second camera sensor corresponds to a row within a predefined number of rows after the row n of the first camera sensor.

In a further example, a non-transitory computer-readable medium is disclosed. The non-transitory computer-readable medium may store instructions that, when executed by a processor, cause a device to, for a first camera including a first camera sensor and a first rolling shutter for sequentially scanning pixels of the first camera sensor, prevent scanning pixels from a first row to a row n of the first camera sensor (n is an integer greater than 1), begin sequentially scanning pixels of the row n of the first camera sensor, and begin sequentially scanning pixels of a first row of a second camera sensor of a second camera concurrently with beginning to sequentially scan pixels of the row n of the first camera sensor. The second camera includes a rolling shutter for sequentially scanning pixels of the second camera sensor and the first row of the second camera sensor corresponds to a row within a predefined number of rows after the row n of the first camera sensor.

In another example, a device is disclosed. The device includes means for, for a first camera including a first camera sensor and a first rolling shutter for sequentially scanning pixels of the first camera sensor, preventing scanning pixels from a first row to a row n of the first camera sensor (n is an integer greater than 1), means for beginning to sequentially scan pixels of the row n of the first camera sensor, and means for beginning to sequentially scan pixels of a first row of a second camera sensor of a second camera concurrently with beginning to sequentially scan pixels of the row n of the first camera sensor. The second camera includes a rolling shutter for sequentially scanning pixels of the second camera sensor and the first row of the second camera sensor corresponds to a row within a predefined number of rows after the row n of the first camera sensor.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Figure 1:
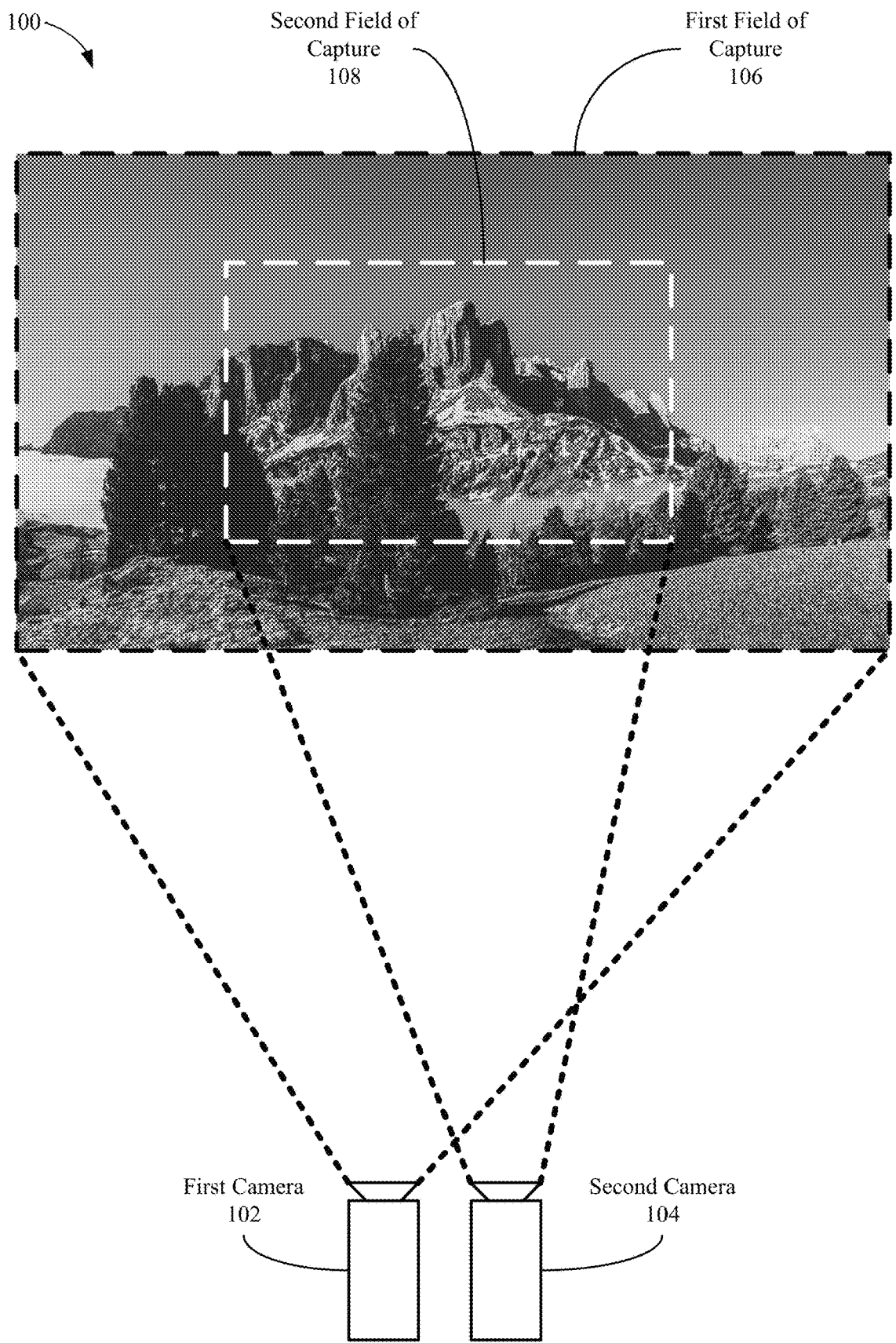
FIG. 1 is a depiction of a first camera and a second camera with different fields of capture.

Aspects of the present disclosure may be used for image capture systems and devices. Some aspects may include synchronizing frame captures from multiple cameras with different fields of capture.

For a system or device controlling multiple cameras, the multiple cameras may be used for imaging applications in capturing frames of a scene. For example, a device (such as a smartphone, tablet, digital camera, or other suitable imaging device) may include a dual camera module with a primary camera and an auxiliary camera, and the device may be configured to provide a 3D image or video of a scene using the primary camera and the auxiliary camera. If the two cameras capture images of the scene at different times, changes in the scene and/or movement of the cameras may cause the corresponding images from the two cameras to have differences impacting a composite image resulting from the corresponding images. For example, an object moving in the scene and corresponding images being captured at different times by the two cameras may cause ghosting in a composite image.

The timing of capturing corresponding frames by multiple cameras may be aligned to reduce differences between the frames that may cause artifacts or other issues with the final images. Conventional alignment techniques rely on synchronizing the start of frame (SoF) between cameras, where each camera is commanded at the same time to begin capturing a frame. If the cameras are not the same type (including the same capture properties and latencies with the device), capturing corresponding images may not be temporally aligned even with synchronizing the SoF between cameras.

In one use case, multiple cameras may be used for providing bokeh effects in images. In an example, a bokeh effect may be applied to a composite image to blur the background of the image while keeping an object (e.g., a person) in the image in focus. If the image captures from multiple cameras are not synchronized or include errors, the edge dividing the person from the background in the image may be incorrectly determined, and portions of the person may appear out of focus, or portions of the background may appear in focus. In another example, image fusion applications (such as for images where the focal length may be adjusted post capture) may have errors from the differences between corresponding frames. For example, camera movement between captures may cause the objects to be a slightly different length from the cameras. The slight movement may cause the focal lengths to slightly differ than if both captures occur at the same time. As a result, ghosting, blurring, or other artifacts may occur in the fused image for the application. In a further example, multiple cameras may be used for depth map applications. For depth mapping, multiple images may be captured from different perspectives, and the differences in location, orientation, and size of an object between the two image frames allows for a depth and location of the object to be determined for a depth map. If the image frame captures are not sufficiently synchronized, camera movements or movements of the object between frame captures may lead to incorrect measurements in location or orientation of the object in one frame in relation to the corresponding frame. As a result, the depth or location of the object may be incorrectly determined for the depth map.

In some aspects of the present disclosure, a first camera and a second camera may capture corresponding frames, and if the field of capture for the first camera is greater than and includes the field of capture for the second camera, the first camera may be prevented from scanning a predefined number of rows of pixels of its camera sensor during capture. For example, the first camera may be prevented from scanning a number of rows at the beginning or top of the camera sensor. In this manner, the first camera may begin scanning rows of pixels closer to pixels corresponding to the second camera's second field of capture, which may begin scanning rows as substantially the same time. Similarly, the first camera may be prevented from scanning one or more rows at the bottom of the field of capture (such as rows not corresponding to the second camera's field of capture). The first camera 102 also may be prevented from scanning a predefined number of columns of pixels (in addition to a number of rows) of the first camera sensor to further synchronize frame captures between the cameras. Different blanking factors of the first and second camera may be used to align when and what portions of the camera sensors to scan. In this manner, the time difference between when the first camera captures a portion of a scene and when the second camera captures the same portion of the scene may be reduced, and the synchronization of frame captures between cameras may be improved (thus reducing possible artifacts or other errors that may occur for imaging applications). In improving synchronization of frame captures, e.g., bokeh effects may include sharper edges in differentiating between a foreground kept in focus and a background that is blurred, fused images may include less artifacts (such as reduced ghosting or blurring of objects in the fused image), and depth maps may include more accurate depths for objects. Other improvements for composite imaging also may exist, as evident from the aspects of the present disclosure described below.

For multiple cameras configured to capture frames of a scene, the fields of capture may differ between cameras. FIG. 1 is a depiction 100 of a first camera 102 and a second camera 104 with different fields of capture 106 and 108. The first camera 102 may include a first field of capture 106, and the second camera 104 may include a second field of capture 108. As shown, the second field of capture 108 may be within the first field of capture 106. In one example, the first camera 102 may include a wide angle lens, and the second camera 104 may include a telescoping lens. In this manner, the second camera 104 may have a higher zoom than the first camera 102 but capture only a portion of the scene captured by the first camera 102 (depicted by the fields of capture 106 and 108). Some devices may include cameras with different zooms, e.g., to support optical zoom for two dimensional (2D) imaging, to perform blurring or other visual effects between a background and foreground for a final image, to adjust the effective field of view of a final image, to adjust the focus of a final image post capture, etc.

Figure 2:
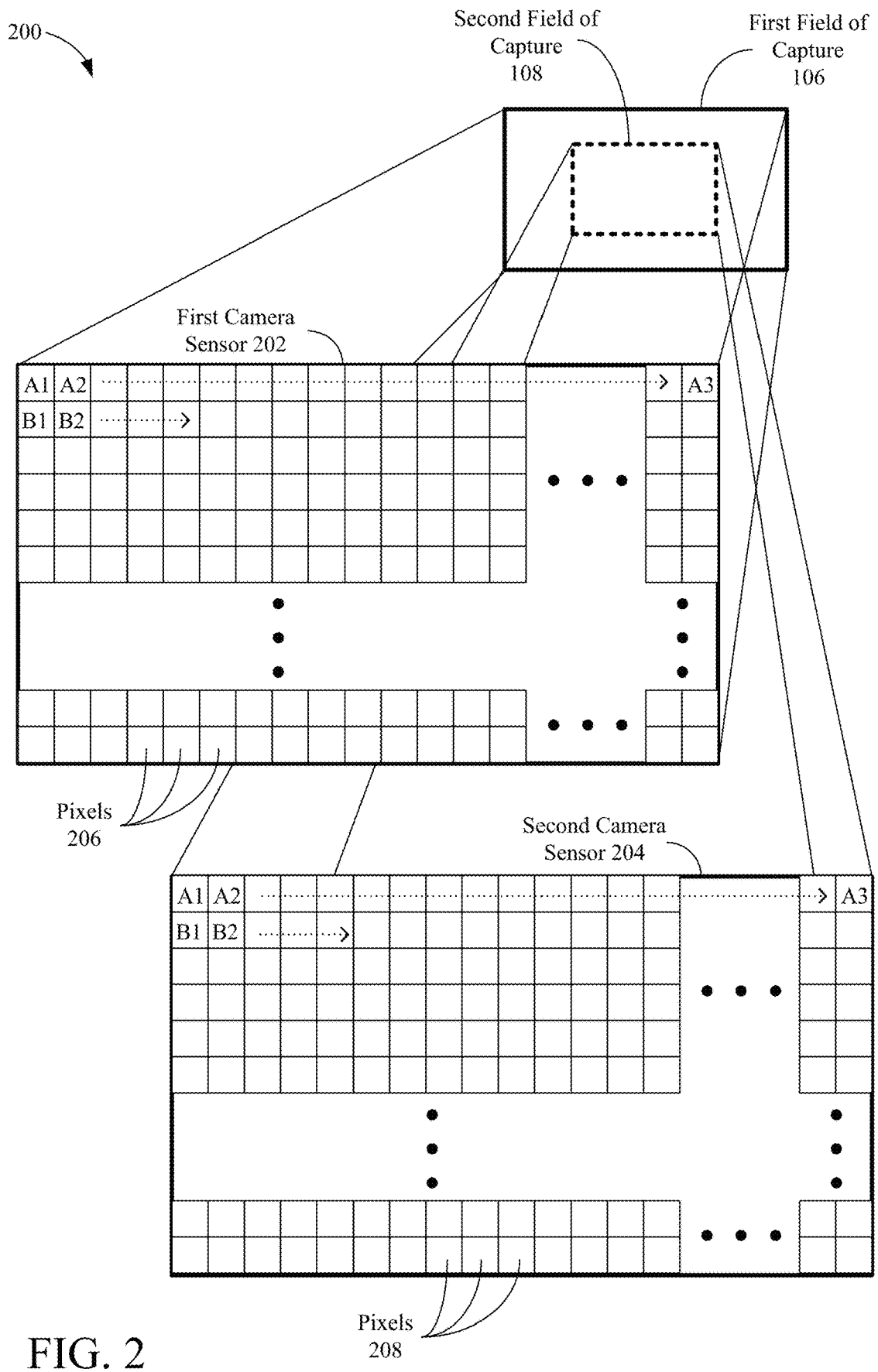
FIG. 2 is a depiction of a first camera sensor for the first camera in FIG. 1 and of a second camera sensor for the second camera in FIG. 1.

FIG. 2 is a depiction 200 of a first camera sensor 202 for the first camera 102 (in FIG. 1) and a second camera sensor 204 for the second camera 104 (in FIG. 1). The first camera sensor 202 may be configured for capturing a scene in the first field of capture 106, and the second camera sensor 204 may be configured for capturing the scene in the second field of capture 108. In some example implementations, each camera sensor 202 and 204 may be a charge-coupled device, a complementary metal oxide semiconductor (CMOS), or other suitable device with an array of pixels for measuring the light received at the pixel. For example, the first camera sensor 202 may include pixels 206, and the second camera sensor 204 may include pixels 208.

A camera may include a "global" or "total" shutter, for which a camera sensor captures a snapshot of the scene instantaneously. In this manner, the light measurement is captured at each pixel at the same time (i.e., all of the pixels in the pixel array for the camera sensor are scanned at the same time). However, many cameras include a "rolling" shutter, for which one or more pixels in the pixel array of the camera sensor are scanned sequentially. In this manner, a first pixel of the pixel array and a second pixel of the pixel array may be scanned at different times. Referring to the first camera sensor 202 and the second camera sensor 204, capturing an image by a camera sensor may include scanning the pixels of the top (first) row of pixels, beginning at the top left pixel of the camera sensor (pixel A1) and scanning from left to right (e.g., scanning pixel A2 after scanning pixel A1) until reaching the end of the row (pixel A3). The second row of pixels may then be scanned from left to right, with pixel B1 and then pixel B2 being scanned, until reaching the end of the row. An image thus may be captured by sequentially scanning all pixels of the camera sensor in a left to right and top to bottom sequence.

Referring back to FIG. 1, if the first camera 102 and the second camera 104 have the same SoF and include a rolling shutter (such as described above), pixels corresponding to different portions of the scene may be scanned at different times by the first camera 102 and the second camera 104. For example, the second camera 104 may begin scanning pixels capturing portions of the mountain while the first camera 102 is still scanning pixels capturing the sky.

In addition, pixel sizes may differ between the camera sensors, the number of pixels may differ between the camera sensors, camera sensor technologies may differ between the cameras, or other characteristics between the cameras may differ, causing the scan rates (the rate at which the pixels of a camera sensor are scanned) between the camera sensors to differ. As a result, even if the first camera sensor 202 (in FIG. 2) and the second camera sensor 204 (in FIG. 2) begin scanning pixel A1 at the same time, the rate at which scanning progresses through the pixel array may differ, and scanning of one of the camera sensors 202 and 204 will be completed before the other. If the cameras move or objects in the scene move during scanning the pixels, corresponding portions of the scene may differ between a first frame from a first camera and a second frame from a second camera. As a result, for cameras with rolling shutters and different fields of capture, synchronizing the SoF between the cameras may not be sufficient to synchronize the frame captures between the cameras.

Referring back to FIG. 1, an example device may prevent a first camera 102 from scanning a predefined number of rows of pixels of the first camera sensor, and the example device may control the first camera 102 to begin scanning rows of pixels closer to pixels corresponding to the second camera's second field of capture 108. In this manner, the time difference between when the first camera 102 captures a portion of a scene and when the second camera 104 captures the same portion of the scene may be reduced, and the synchronization of frame captures between cameras may be improved. In some additional example implementations, the device may prevent the first camera 102 from scanning a predefined number of columns of pixels (in addition to a number of rows) of the first camera sensor to further synchronize frame captures between the cameras.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device including, coupled, or couplable to two or more cameras capable of capturing images or video (such as security systems, smartphones, tablets, laptop computers, digital video and/or still cameras, web cameras, virtual reality (VR) headsets, augmented reality (AR) headsets, and so on with two or more cameras or camera sensors). While described below with respect to a device having or coupled to two cameras, aspects of the present disclosure are applicable to devices having any number of cameras, and are therefore not limited to devices having two cameras. In one example, a device may include three or more cameras whose frame captures are to be synchronized. In another example, a device may include no cameras, and provide commands or instructions for controlling cameras of a multiple camera system. Further, aspects of the present disclosure are applicable for capturing still images as well as for capturing video, and may be implemented in devices having or coupled to cameras of the same or different capabilities (such as a video camera or a still image camera) and characteristics (such as resolution, shutter speed, camera sensor type, etc.).

The term "device" is not limited to one or a specific number of physical objects (such as one smartphone, one camera controller, one processing system and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects.

Figure 3:
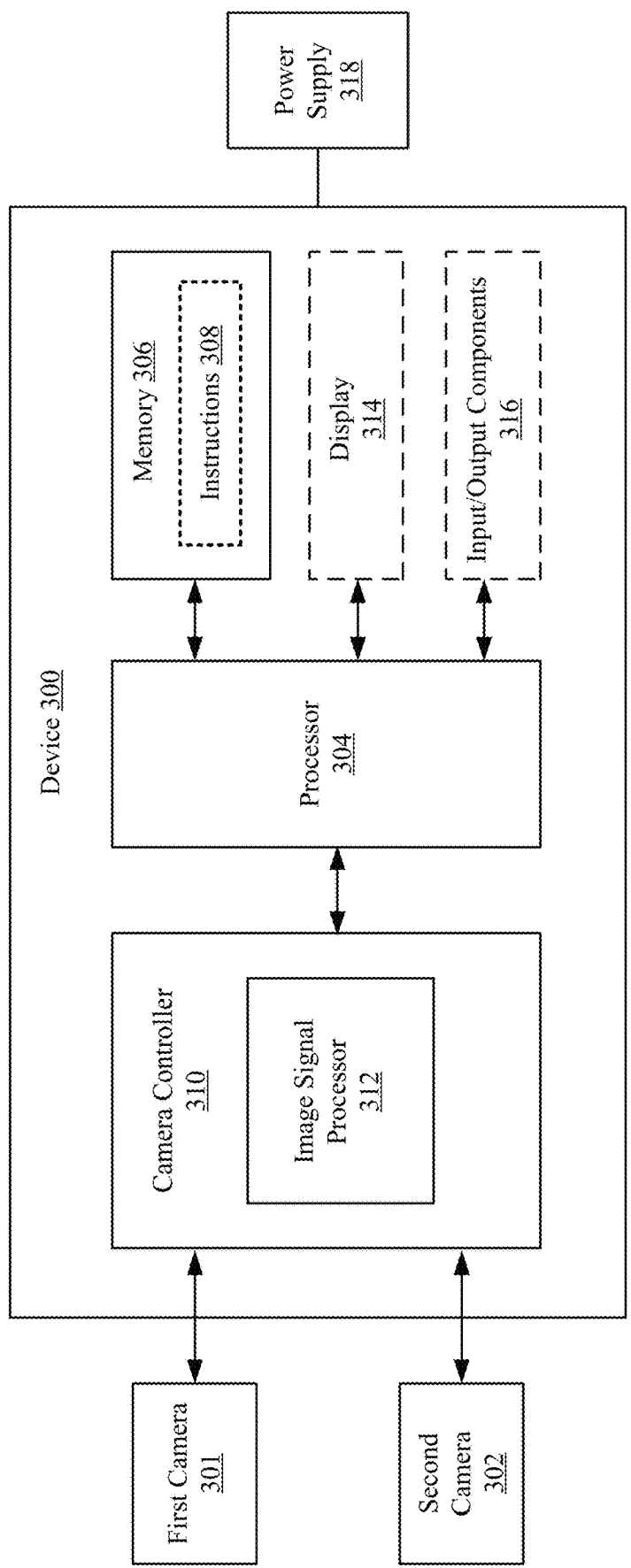
FIG. 3 is a block diagram of an example device for synchronizing frame captures from multiple cameras.

FIG. 3 is a block diagram of an example device 300 for synchronizing frame captures from multiple cameras. The example device 300 may include or be coupled to a first camera 301 and a second camera 302. The example device 300 also may include a processor 304, a memory 306 storing instructions 308, and a camera controller 310. The device 300 optionally may include (or be coupled to) a display 314 and a number of input/output (I/O) components 316. The device 300 may include additional features or components not shown. In one example, a wireless interface, which may include a number of transceivers and a baseband processor, may be included for a wireless communication device. In another example, one or more motion sensors (such as a gyroscope) may be included in a device. The device 300 may include or be coupled to additional cameras other than the first camera 301 and the second camera 302. The disclosure should not be limited to any specific examples or illustrations, including the example device 300.

The first camera 301 and the second camera 302 may be capable of capturing individual image frames (such as still images) and/or capturing video (such as a succession of captured image frames). The first camera 301 may include a first camera sensor (not illustrated), and the second camera 302 may include a second camera sensor (not illustrated). Each camera sensor includes a pixel array, and each camera 301 and 302 includes a rolling shutter.

The first camera 301 and the second camera 302 may be oriented to capture frames of a scene, with the first camera 301 having a first field of capture and the second camera 302 having a second field of capture including a portion of the first field of capture. In some example implementations, the first camera 301 and/or the second camera 302 may include an optical zoom (such as a camera lens with an adjustable focal length). In some other example implementations, the focal length for each of the first camera 301 and the second camera 302 may be fixed. The first camera 301 and the second camera 302 may be separated by a distance for 3D imaging of a scene in the overlapping portion of the fields of capture for the cameras 301 and 302.

The memory 306 may be a non-transient or non-transitory computer readable medium storing computer-executable instructions 308 to perform all or a portion of one or more operations described in this disclosure (such as for controlling the first camera 301 and the second camera 302 for frame capture). In some example implementations, the memory 306 may store imaging applications to be executed by the device 300, for which frame captures are to be synchronized for the first camera 301 and the second camera 302. The device 300 also may include a power supply 318, which may be coupled to or integrated into the device 300.

The processor 304 may be one or more suitable processors capable of executing scripts or instructions of one or more software programs (such as instructions 308) stored within the memory 306. For example, the processor 304 may be an applications processor and execute an imaging application for the first camera 301 and the second camera 302 (such as 3D imaging, stacking of images, VR applications, AR applications, portrait mode imaging, etc.). In some aspects, the processor 304 may be one or more general purpose processors that execute instructions 308 to cause the device 300 to perform any number of functions or operations. In additional or alternative aspects, the processor 304 may include integrated circuits or other hardware to perform functions or operations without the use of software.

While shown to be coupled to each other via the processor 304 in the example of FIG. 3, the processor 304, the memory 306, the camera controller 310, the optional display 314, and the optional I/O components 316 may be coupled to one another in various arrangements. For example, the processor 304, the memory 306, the camera controller 310, the optional display 314, and/or the optional I/O components 316 may be coupled to each other via one or more local buses (not shown for simplicity).

The display 314 may be any suitable display or screen allowing for user interaction and/or to present items (such as captured images, video, or preview images from one or both of the cameras 301 and 302) for viewing by a user. In some aspects, the display 314 may be a touch-sensitive display. In one example, the display 314 may include one or more displays for VR, AR, or 3D imaging applications.

The I/O components 316 may be or include any suitable mechanism, interface, or device to receive input (such as commands) from the user and to provide output to the user. For example, the I/O components 316 may include (but are not limited to) a graphical user interface, keyboard, mouse, microphone and speakers, and so on.

The camera controller 310 may include an image signal processor 312, which may be one or more image signal processors to process captured image frames or video provided by the first camera 301 and the second camera 302. In some example implementations, the camera controller 310 (such as the image signal processor 312) also may control operation of the first camera 301 and the second camera 302. For example, the camera controller 310 (such as the image signal processor 312) may control synchronizing frames captures between the first camera 301 and the second camera 302.

In some aspects, the image signal processor 312 may execute instructions from a memory (such as instructions 308 from the memory 306 or instructions stored in a separate memory coupled to the image signal processor 312). In some other aspects, the image signal processor 312 may include specific hardware to perform one or more operations described in the present disclosure. The image signal processor 312 alternatively or additionally may include a combination of specific hardware and the ability to execute software instructions.

While the following examples for synchronizing frame captures between cameras are described in reference to the example device 300 in FIG. 3, any suitable device including, coupled, or couplable to two or more cameras may be used. The below examples are for illustrative purposes. The present disclosure should not be limited to a specific device, system, or configuration of components, including a specific number of cameras.

Some imaging applications require synchronizing frame captures between the first camera 301 and the second camera 302. For example, 3D imaging (such as for VR) or an image stacking application may use overlapping portions of the scene in frames from the cameras 301 and 302 (corresponding to the overlap in the fields of capture for the cameras 301 and 302) to generate a composite 3D or final image. The application may require temporal alignment of frame captures from the first camera 301 and the second camera 302 to reduce artifacts or ghosting in a composite 3D or final image. However, only synchronizing the SoF between the cameras 301 and 302 may not prevent the cameras 301 and 302 from capturing a portion of the scene at different times from one another. In some example implementations, the device 300 may operate the cameras 301 and 302 to prevent scanning portions of a pixel array for one or both camera sensors that are not associated with the overlapping portion of the fields of capture. In this manner, the portions of the pixel arrays that are scanned are more closely related, as portions of a pixel array not corresponding to any portion of the other pixel array might not be scanned.

Figure 4:
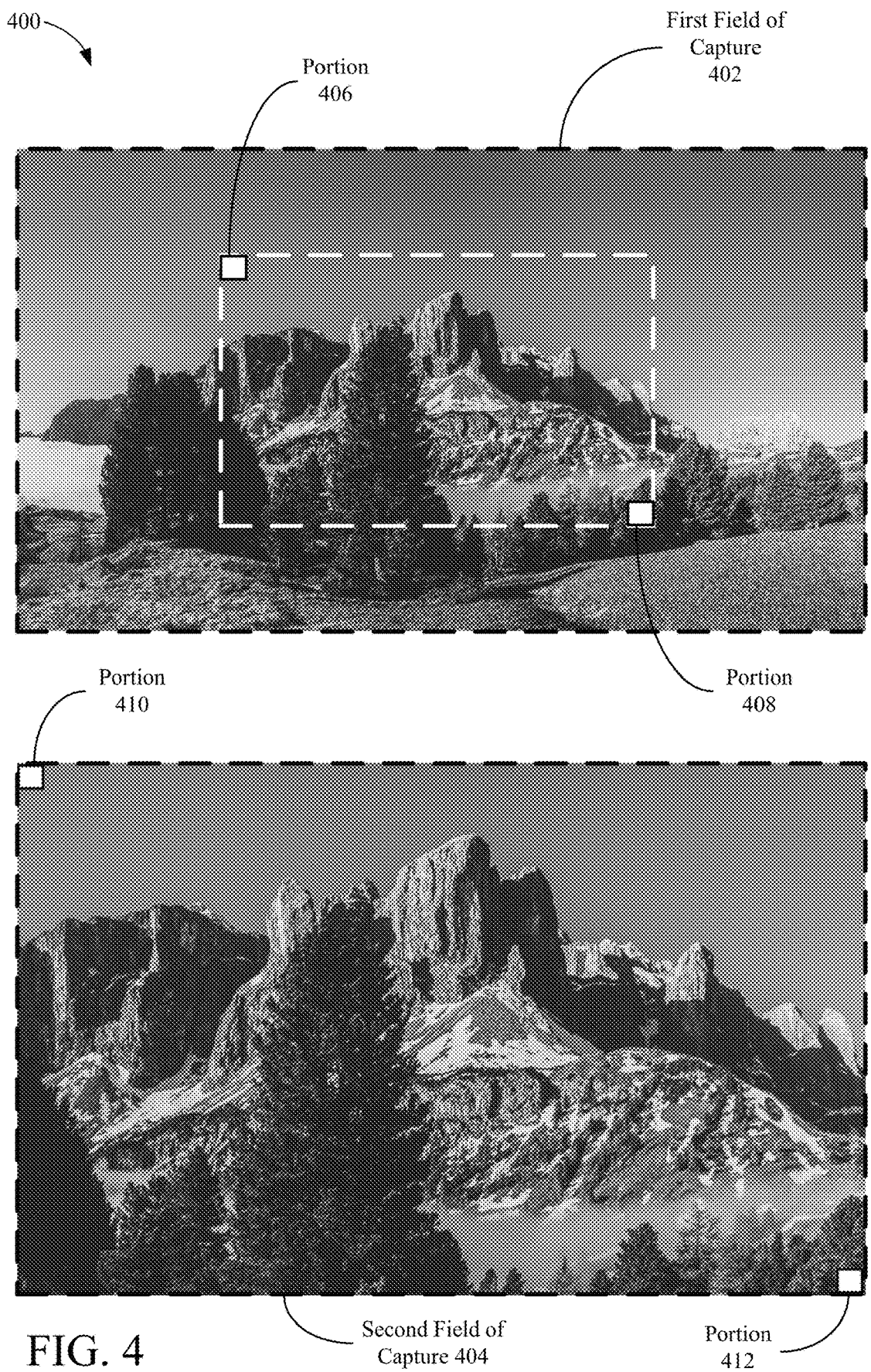
FIG. 4 is a depiction of a first field of capture and an overlapping second field of capture for two cameras.

FIG. 4 is a depiction 400 of an example first field of capture 402 for the first camera 301 (in FIG. 3) and an overlapping second field of capture 404 for the second camera 302 (in FIG. 3). As shown, the second field of capture 404 corresponds to the white boxed portion of the first field of capture 402, which may be considered the overlapping field of capture. While the second field of capture 404 is illustrated as being completely within the first field of capture 402 in FIG. 4, in other example implementations, one or more portions of the second field of capture may be outside the first field of capture. An imaging application may use the overlapping portion of the fields of capture for a final image. For example, a 3D image may be generated for the scene of the mountain in the white box of the first field of capture 402 and in the second field of capture 404.

As shown, the first field of capture 402 outside the white box does not correspond to any portion of the second field of capture 404. If the device 300 can prevent the first camera 301 from scanning pixels in the first camera sensor corresponding to the first field of capture 402 outside the white box (thus reducing the size of the frame capture), the frame capture for the first camera 301 may more closely correspond to the frame capture for the second camera 302. For example, the device 300 may control the first camera 301 to begin scanning rows of pixels at a row associated with the portion 406 (which corresponds to the portion 410). In this manner, the rows of pixels of the camera sensor associated with the first field of capture 402 above the portion 406 may not be scanned. The device 300 also may control the first camera 301 to end scanning rows of pixels at a row associated with the portion 408 (which corresponds to the portion 412). In this manner, the rows of pixels of the camera sensor associated with the first field of capture 402 below the portion 408 may not be scanned. All rows of pixels in the second camera sensor may be scanned for the present example (with the entirety of the second field of capture 404 overlapping the first field of capture 402).

In some example implementations, the device 300 may control the first camera 301 and the second camera 302 to synchronize beginning scanning pixels associated with the portion 406 (for the first camera sensor) and scanning pixels associated with the portion 410 (for the second camera sensor). In this manner, the pixels between the cameras 301 and 302 corresponding to the same portion of the scene may be scanned concurrently. In some example implementations, a synchronized SoF may cause the first camera 301 to begin scanning pixels associated with portion 406 and may cause the second camera 302 to begin scanning pixels associated with portion 410.

One example of preventing the first camera 301 from scanning one or more rows of the first camera sensor is through use of a blanking factor. A blanking factor may be a command generated by the device 300 to prevent the first camera 301 (or the second camera 302) from scanning a portion of the camera sensor. A first blanking factor (called a first row blanking factor) may indicate which row to begin scanning, with previous rows of pixels not scanned. Similarly, a second blanking factor (called a last row blanking factor) may indicate which row to end scanning, with subsequent rows of pixels not scanned.

The device 300 also may command a camera as to which columns of pixels of a camera sensor to scan. For example, the device 300 may control the first camera 301 to begin scanning columns of pixels at a column associated with the portion 406 (which corresponds to the portion 410). In this manner, the columns of pixels of the camera sensor associated with the first field of capture 402 to the left of the portion 406 may not be scanned. The device 300 also may control the first camera 301 to end scanning columns of pixels at a column associated with the portion 408 (which corresponds to the portion 412). In this manner, the columns of pixels of the camera sensor associated with the first field of capture 402 to the right of the portion 408 may not be scanned.

Similar to the above example of preventing scanning of rows of pixels, one example of preventing the first camera 301 from scanning one or more columns of pixels of the first camera sensor is through use of a blanking factor. A third blanking factor (called a first column blanking factor) may indicate which column to begin scanning, with previous columns of pixels not scanned. Similarly, a fourth blanking factor (called a last column blanking factor) may indicate which column to end scanning, with subsequent columns of pixels not scanned. In this manner, the first through fourth blanking factors may be set to control the first camera 301 to scan pixels only associated with the overlapping field of capture by setting which rows and columns of pixels to scan.

In some example implementations, blanking factors may include an amount of time indicating when to start or stop scanning pixels. The blanking factors may be set for the second camera 302 with the narrower field of capture to align scanning of pixels of the second camera sensor with the scanning of pixels associated with the overlapping field of capture of the first camera sensor. Referring to FIG. 4, the time to scan the first camera sensor from pixels associated with portion 406 to pixels associated with portion 408 is to approximately align with the time to scan all pixels of the second camera sensor. In this manner, one or more blanking factors for the second camera 302 may include the amount of time to scan the rows of pixels of the first camera sensor preceding portion 406. For example, if both camera sensors are 400×200 pixels, and the second field of capture 404 is half of the first field of capture 402 (with the same center), 25 percent of the rows of the first camera sensor are to be scanned before scanning pixels associated with portion 406. 25 percent times 200 rows times 400 pixels per row equals 20,000 pixels of the first camera sensor to be scanned before scanning pixels associated with portion 406. The number 20,000 pixels may be converted into an amount of time to scan the pixels based on the first camera's scan rate. For example, if 5,000 pixels may be scanned per 1 millisecond (ms), the amount of time to scan the 20,000 pixels is 4 ms. A first row blanking factor for the second camera 302 may include the 4 ms, and thus cause the second camera 302 to delay scanning the first pixel by 4 ms. The amount of time may be called a blanking time. In some example implementations, frame captures between the cameras 301 and 302 may be compared to determine whether a blanking time should be adjusted. For example, values from corresponding pixels associated with a portion of the overlapping field of capture may be compared. The blanking time may be adjusted to attempt to reduce the difference between the values from the corresponding pixels.

In some additional or alternative implementations, a blanking factor may include an indication of a row or a column from which to start or stop scanning pixels (such as the first through fourth blanking factors described above). For the above example of cameras sensors that are 400×200 pixels and the second field of capture 404 is half of the first field of capture 402 (with the same center), the first 50 rows of the first camera sensor may not correspond to any rows of the second camera sensor. A blanking factor for the first camera 301 therefore may include an indication that the first 50 rows of the first camera sensor are not to be scanned. Further, the blanking factor or another blanking factor may include an indication that the first 100 columns of the first camera sensor also are not to be scanned. Similarly, the blanking factor or other blanking factors may include an indication that the last 50 rows are not to be scanned and may include an indication that the last 100 columns are not to be scanned.

In some example implementations, one or more blanking factors may be adjusted to compensate for changes in the orientation or degradation of the cameras 301 and 302 through repeated use. As devices age, the device body may warp to cause changes in orientation between the cameras 301 and 302. As a result, the overlapping field of capture between the cameras 301 and 302 may change over time. Additionally or alternatively, degradation of camera components over time may impact the scan rates for the cameras 301 and 302. In comparing frame captures between the cameras 301 and 302, the device 300 may identify changes in the overlapping field of capture or changes in the scan rate.

In some examples, the device 300 periodically, or by request, may compare corresponding images in determining if changes in the field of capture or scan rate exist. For example, the device 300 may identify known objects or identifiable objects in corresponding image frames. The device then may determine a difference in location of the object within the respective image frames and a size of the object. If the size of the object is different than previously determined for the same type of object in previous frames, the device 300 may determine from the difference the new overlapping field of capture. In addition or the alternative, if the location of the object is different than previously determined for previous frames, the device 300 may use the location difference to determine the new overlapping field of capture. In some alternative examples, the device 300 may compare rows of the first camera's captures to rows of the second camera's corresponding captures to determine if rows of the first camera sensor now correspond to different rows of the second camera sensor. Columns also may be compared. In this manner, the device 300 may determine a new overlapping field of capture. The difference between the new overlapping field of capture and the previous overlapping field of capture then may be used by the device 300 to determine the current orientations of the cameras 301 and 302 relative to one another.

In some examples of determining a change in scan rate, the device 300 may determine that ghosting or other artifacts are increasing in frequency or intensity for composite images. The device 300 may measure the number of frames captured over a period of time, or the device 300 may measure the number of pixels that may be scanned over a period of time, and the measurement may be compared to the initial rates for the camera. The device 300 may determine a change in scan rate and the severity of the difference based on the differences in the measured rate and initial rates and the size of the differences, respectively.

The device 300 thus may adjust one or more blanking factors for the first camera 301 and the second camera 302 to compensate for the identified changes. In one example, the device 300 may adjust the blanking times. In another example, the device 300 may adjust one or more blanking factors including the number of rows and/or columns of a camera sensor not to be scanned.

Regarding the scan rates of the cameras 301 and 302, differences between the cameras 301 and 302 may cause the scan rates to differ. For example, the clock rate tied to the scan rate, the camera sensor resolution, the type of camera sensor, and other characteristics may differ between the first camera 301 and the second camera 302 to cause the scan rates to differ. Further, a camera shutter setting may be set, which may cause a difference in the scan rate. As a result, the first camera 301 and the second camera 302 may increasingly differ in which portions of the scene are being captured at a point in time (since one camera scans pixels at a faster rate than the other camera). The device 300 may control the scan rate for one or both cameras 301 and 302 to maintain a temporal alignment in scanning pixels associated with the overlapping field of capture. The device 300 thus may reduce the time difference in between the cameras 301 and 302 scanning the same portions of the scene caused by the different scan rates.

In some example implementations, the scan rate of a camera for one pixel may not change, but the device 300 may use one or more blanking factors to prevent or delay scanning of pixels. In this manner, the average or overall scan rate may be adjusted. Referring back to FIG. 4, the device 300 may use blanking factors to control when to start and stop scanning by the first camera sensor. The first camera 301 may scan a row z associated with a location in the first field of capture 402 between the portion 406 and the portion 408. Row z of the first camera sensor may correspond to one or more rows of the second camera sensor. The device 300 may control the first camera 301 and the second camera 302 to scan row z of the first camera sensor approximately concurrently with scanning the corresponding one or more rows of the second camera sensor.

Using the above example of the camera sensors being 400×200 pixels, the second field of capture 404 being half the first field of capture 402, and the fields of capture 402 and 404 having the same centers, the row z from column 51 to column 150 of the first camera sensor may correspond to two rows of the second camera sensor. As a result, 200 pixels of the first camera sensor (pixels from column 101 to column 300 of row z) may correspond to 800 pixels of the second camera sensor (2 rows of 400 pixels). The device 300 may use one or more blanking factors for the first camera 301 to slow scanning the 200 pixels of row z so that the time when scanning is approximately aligned to the time when the second camera 302 scans the two corresponding rows.

In some other example implementations of preventing the first camera 301 from scanning one or more rows and/or one or more columns of pixels of the camera sensor (based on, e.g., blanking factors), the first camera 301 may scan all pixels of the camera sensor and crop unneeded values. The camera 301 or the device 300 may crop from a captured frame the pixel values not associated with the overlapping field of capture. For example, the device 300 may discard the values for the pixels (such as replacing them with blank values or outputting a smaller frame without the pixel values). The location, dimensions and size of the cropping in the camera sensor is based on the location, dimensions and size of the overlapping field of capture relative to the fields of capture for the first or second camera. For example, the cropped frame for the scene in the first field of capture 402 may be similar to the portion of the scene in the white box.

For cropping the values, the device 300 may control the first camera 301 and the second camera 302 to temporally align scanning pixels associated with the portion 406 and the portion 410. For example, a number of pixels from the first pixel to a pixel associated with the portion 406 of the first camera sensor may be scanned before scanning the pixel associated with the portion 406. The rate at which the pixels of the first camera sensor are scanned (scan rate) may be used to determine the amount of time to scan the pixels prior to the pixel associated with portion 406. Beginning scanning the second camera sensor then may be delayed by the determined amount of time so that the corresponding pixels associated with the corresponding portions 406 and 410 are scanned concurrently (such as through determining and setting a blanking time). In some example implementations, the scan rate may be adjusted also to synchronize scanning of corresponding camera sensor pixels.

Referring back to the differing fields of capture with overlap, the overlapping field of capture for the first camera 301 and the second camera 302 may be fixed or adjustable. In some example implementations, if the orientations of the cameras 301 and 302 are fixed relative to one another, and the focal length is not adjustable for either camera 301 and 302, the overlap between the fields of capture may be fixed. In some other example implementations, if the positions of the cameras 301 and 302 relative to one another may change, or one or both of the cameras 301 and 302 have an optical zoom, the first field of capture 402 and/or the second field of capture 404 may change. For example, if the first camera 301 includes an optical zoom, the first camera 301 may narrow its field of capture 402 toward the second camera's field of capture 404 when zooming in.

If the overlapping field of capture is fixed (with the fields of capture 402 and 404 fixed in relation to one another), the device 300 may, e.g., store a correlation of the first camera sensor and the second camera sensor for the overlap (indicating which pixels of a first camera sensor correspond to which pixels of a second camera sensor). In another example, the device 300 may store the blanking factors to be used in aligning the pixel scans for the pixels associated with the overlapping field of capture in synchronizing the frame captures.

If one or both fields of capture 402 and 404 are adjustable such that the overlapping field of capture may change, the device 300 may determine the overlap based on known features of the cameras 301 and 302. For example, if the second field of capture 404 is fixed and the first field of capture 402 is adjustable based on an adjustable focal length of the first camera 301, the device 300 may determine the overlapping field of capture based on the focal length of the first camera 301. For example, in determining the overlap, the device 300 may determine the blanking factors. In another example when cropping the values, the device 300 may determine the size and location to be cropped of the captured frame from the first camera sensor.

In preventing scanning one or more rows and one or more columns of pixels of a first camera sensor (based on, e.g., one or more blanking factors), the device 300 may control a camera (such as the first camera 301) to scan rows and/or columns immediately outside the rows and columns of pixels corresponding to the overlapping field of capture.

Figure 5:
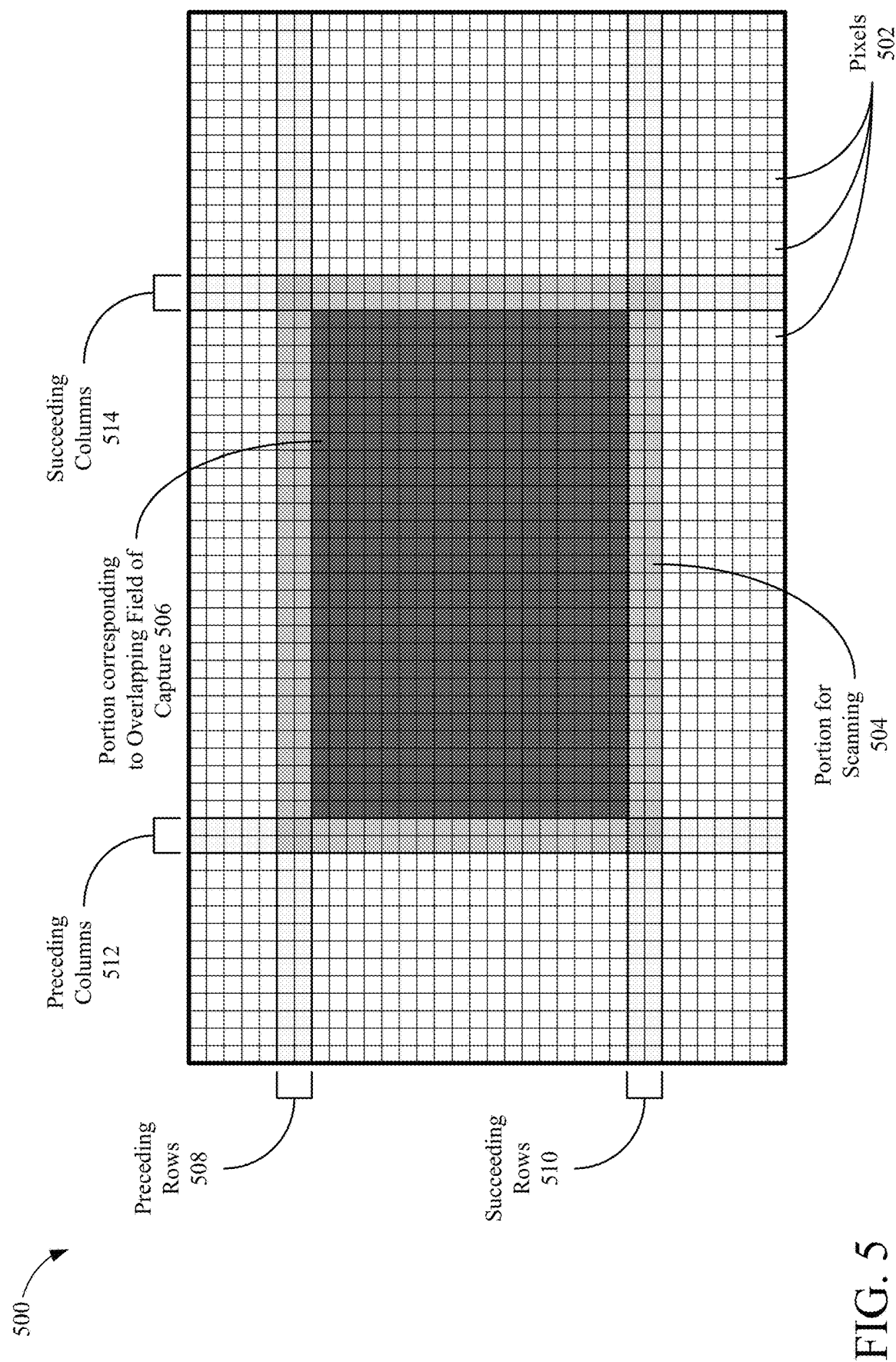
FIG. 5 is a depiction of a portion of the first camera sensor that is scanned, with the portion that is scanned being larger than the portion of the first camera sensor corresponding to the overlapping field of capture.

FIG. 5 is a depiction of a portion 504 (of the first camera sensor 500) that is to be scanned, with the portion 504 for scanning being larger than the portion 506 of the first camera sensor 500 corresponding to the overlapping field of capture. The preceding rows 508 and the succeeding rows 510 to the rows of the portion 506 may be scanned when capturing a frame. In addition, the preceding columns 512 and the succeeding columns 514 to the columns of the portion 506 also may be scanned when capturing a frame. The first camera sensor 500 is depicted for illustrative purposes and is not drawn to scale. For example, the first camera sensor 500 may include more or less rows and columns of pixels 502, the portion 506 corresponding to the overlapping field of capture may be of a different size, shape, or location, the number of rows and/or columns for the portion 504 for scanning and outside the portion 506 may be more or less than two (such as zero, one, three, etc.), or any other suitable differences may exist for the first camera sensor 500. For example, the number of preceding rows 508 and succeeding rows 510 may be any suitable number of rows (such as 0, 1, 2, etc.), and the number of preceding rows 508 and the number of succeeding rows 510 may be the same or different. Further, the number of preceding columns 512 and succeeding columns 514 may be any suitable number of columns (such as 0, 1, 2, etc.), and the number of preceding columns 512 and the number of succeeding columns 514 may be the same or different.

In some examples, the cameras 301 and 302 may be separated by a distance. Additionally or alternatively, the cameras 301 and 302 may have different pitches, yaws, and/or rolls. After capturing corresponding frames by the cameras 301 and 302, the device 300 may rectify the captured frames to a single reference plane (compensating for differences in perspective based on the distance, pitch, yaw, and/or roll between the cameras 301 and 302. Capturing additional rows and columns of the first camera sensor 500 outside the portion 506 may allow for rectification between the corresponding frame captures.

In some further examples, the overlapping field of capture may change over time or use of the cameras 301 and 302. Capturing additional rows and columns of the first camera sensor 500 outside the portion 506 may allow for the device 300 to compare frame captures and determine whether the overlapping field of capture has changed. Other suitable reasons for capturing additional rows and/or columns of the first camera sensor 500 may exist, and the present disclosure should not be limited to the above examples.

The number of columns and rows to be scanned outside the portion 506 may be based on the differences between the cameras 301 and 302. For example, a greater distance, pitch, roll, or yaw between the cameras 301 and 302 may correspond to a greater number of rows and columns to be scanned outside the portion 506 (as rectification may be more drastic). In another example, the number of columns and rows to be scanned may be based on the camera sensor resolutions. For example, an increased resolution for the second camera 302 may mean that a pixel of the first camera sensor corresponds to a greater number of pixels in the second camera sensor. In this manner, fewer rows and columns may be scanned outside the portion 506 since each row or column of the first camera sensor 500 may correspond to a greater number of rows or columns, respectively, of the second camera sensor with decreased resolution.

Additionally or alternatively, the number of columns and rows to be scanned outside the portion 506 may be based on the imaging application or the operating conditions for the first camera 301 and the second camera 302. For example, the number of rows and columns to be captured may be increased if the movement of the cameras 301 and 302 increases (such as for action cameras or other imaging applications). The number of columns and rows to be scanned also may be based on processing restrictions of the device 300 and latency requirements for an imaging application. For example, VR applications may have low latency requirements to provide 3D images to a user in near realtime. The device 300 thus may reduce the number of row and columns to be scanned outside the portion 506 to reduce the processing resources required for the captured frames.

Figure 6:
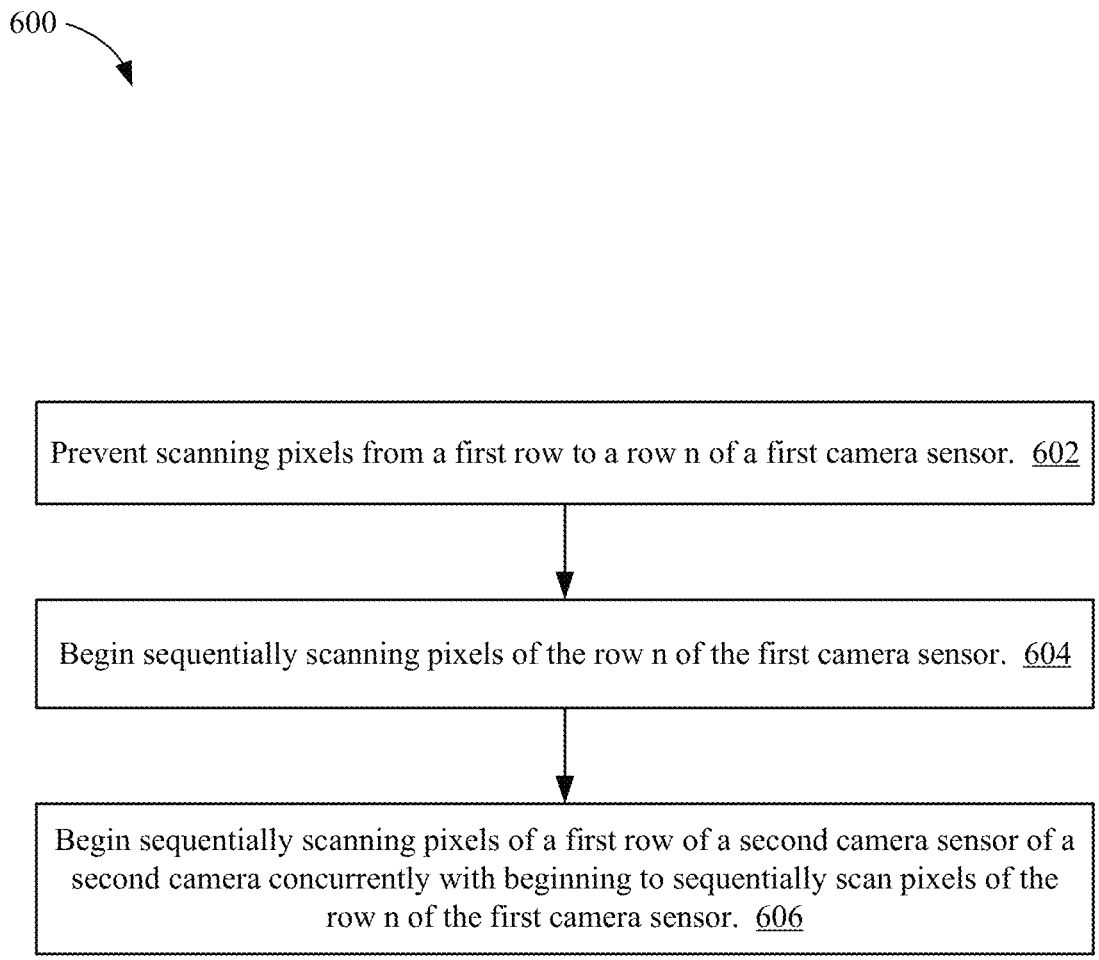
FIG. 6 is an illustrative flow chart depicting an example operation for synchronizing frame captures between a first camera and a second camera.

In synchronizing frame captures, the device 300 may control operation of the first camera 301 and the second camera 302 to temporally align the scans between the first camera 301 and the second camera 302 in synchronizing frame captures. For example, the device 300 (such as the camera controller 310 or the image signal processor 312) may determine and provide blanking factors to the first camera 301 and/or to the second camera 302 in synchronizing frame captures. As previously described, a camera may be prevented from scanning one or more rows (and one or more columns) of pixels of the camera's sensor. FIG. 6 is an illustrative flow chart depicting an example operation 600 for synchronizing frame captures between the first camera 301 and the second camera 302. In the example operation 600, the first camera 301 is prevented from scanning one or more rows of the first camera sensor. Beginning at 602, the device 300 may prevent the first camera 301 from scanning pixels from a first row to a row n of a first camera sensor (where n is an integer greater than 1). For example, the device 300 may generate a blanking factor for a first camera 301 to prevent one or more rows before row n from being scanned. In some example implementations, n may be predefined or determined based on the overlapping field of capture with the second camera 302.

The first camera 301 then may begin sequentially scanning pixels of the row n of the first camera sensor (604). Concurrently with beginning to sequentially scan pixels of the row n of the first camera sensor, the second camera 302 may begin sequentially scanning pixels of a first row of the second camera sensor (606). In some example implementations, the device 300 may synchronize the SoF for the first camera 301 and the SoF for the second camera 302 to synchronize beginning scanning row n of the first camera sensor with beginning scanning the first row of the second camera sensor. Referring to the example first camera sensor 500 in FIG. 5, the example operation 600 in FIG. 6 depicts preventing the first camera 301 from scanning the rows prior to the preceding rows 508, and further depicts beginning scanning a first row of the portion 504 with a first row of a second camera sensor.

The device 300 also may prevent the first camera 301 from scanning one or more rows after the rows associated with the overlapping field of capture. The device 300 further may prevent the first camera 301 from scanning one or more columns before and after the columns associated with the overlapping field of capture. For example, referring back to the example first camera sensor 500 in FIG. 5, the first camera 301 may be prevented (based on, e.g., one or more blanking factors) from scanning rows before the preceding rows 508 and may be prevented from scanning rows after the succeeding rows 510. The first camera 301 further may be prevented from scanning columns before the preceding columns and prevented from scanning columns after the succeeding columns.

Figure 7:
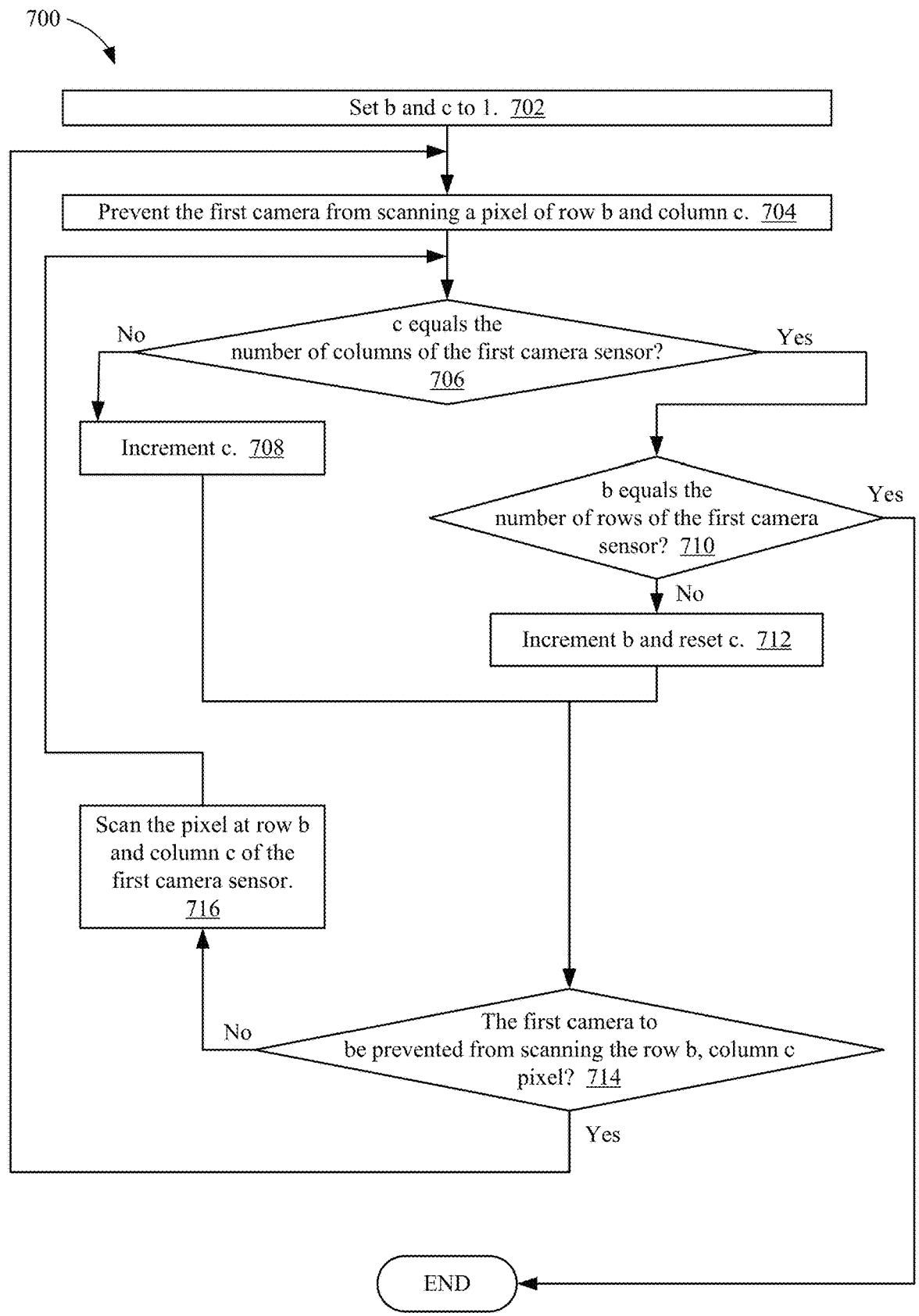
FIG. 7 is another illustrative flow chart depicting an example operation for synchronizing frame captures between the first camera and the second camera.

FIG. 7 is another illustrative flow chart depicting an example operation 700 for synchronizing frame captures between the first camera 301 and the second camera 302. In the example operation 700, the first camera 301 is prevented from scanning one or more rows and one or more columns of the first camera sensor. While the example operation 700 illustrates determining whether to prevent scanning on a pixel-by-pixel basis, the determinations as to whether to scan may be made prior to the scan operation for a pixel. For example, the device 300 may store one or more blanking factors for a fixed overlapping field of capture to prevent specific pixels from being scanned. In another example, a determination of preventing scanning may be made for a batch of pixels (such as one or more rows or one or more columns based on a blanking factor or a blanking time), instead of one pixel at a time. The example operation 700 may be a logical flow to assist in explaining some concepts of the present disclosure. However, the present disclosure should not be limited to the example operation 700, as other suitable processes for preventing scanning of pixels may be performed.

Beginning at 702, an integer b and an integer c may be set to one. The first camera 301 may be prevented from scanning the pixel of row b and column c of the first camera sensor (704). For example, when b and c equal one, the first camera 301 is prevented from scanning the first pixel of the first row and first column of the first camera sensor (such as the top-left pixel of the first camera sensor).

Proceeding to 706, if c does not equal the number of columns of the first camera 301, c may be incremented (708). In this manner, the device may proceed through each pixel in a row b of the first camera sensor. After incrementing c, the device 300 may determine whether to prevent the first camera 301 from scanning the pixel at row b and column c of the first camera sensor (714). Referring back to FIG. 5, if the row b, column c pixel is outside the portion 504 (including the preceding and succeeding rows and columns), the device 300 may determine that the first camera 301 is to be prevented from scanning the pixel. In some example implementations, the device 300 may provide one or more blanking factors to the first camera 301 to indicate which pixels of the first camera sensor to be prevented from being scanned.

In 706, if c equals the number of columns of the first camera sensor (the last pixel in the row b is reached), the process may flow to 710. If b does not equal the number of rows of the first camera sensor, b may be incremented, and c may be reset to one (712). The process may then flow to 714, and the device 300 may determine whether the first camera 301 is to be prevented from scanning the pixel at row b and column c of the first camera sensor. For example, the device 300 may determine whether the pixel is outside the portion 506 of the first camera sensor 500 in FIG. 5.

If the first camera 301 is to be prevented from scanning the pixel, the process may revert to 704, and the first camera 301 may be prevented from scanning the pixel of row b and column c of the first camera sensor. If the first camera 301 is not to be prevented from scanning the pixel, the process may flow to 716. For example, the device 300 may determine that the pixel is in the portion 506 of the first camera sensor 500 in FIG. 5 (e.g., based on one or more blanking factors). The first camera may scan the pixel at row b and column c of the first camera sensor (716). The process then may revert to 706.

Referring back to 710, if b equals the number of rows of the first camera sensor (the last pixel at the last row and last column is reached), the process may end (with all pixels of the first camera sensor having been analyzed as to whether to scan).

As shown from the example operations 600 and 700 in FIGS. 6 and 7, respectively, the first camera 301 may be prevented from scanning one or more top rows, bottom rows, left columns, and right columns of pixels of the camera sensor in synchronizing frame captures with the second camera 302. For example, referring again to FIG. 5, if the first row of the preceding rows 508 is row n of the first camera sensor 500, the first camera 301 may be prevented from scanning pixels of the rows before row n. If the last row of the succeeding rows 510 is row p of the first camera sensor 500, the first camera 301 may be prevented from scanning pixels of the rows after row p.

In scanning pixels of row n, the first column of the preceding columns 512 may be a column r+1. The first camera 301 may be prevented from scanning row n pixels of column 1 to column r of the first camera sensor. In this manner, the first camera 301 may begin sequentially scanning pixels at row n and column r+1. The last column of the succeeding columns 514 may be a column s−1. The first camera 301 may end sequentially scanning row n pixels at column s−1. The first camera 301 thus may be prevented from scanning row n pixels from column s to the last column of the first camera sensor. Similarly, while scanning pixels of a row q greater than n and less than or equal to row p of the first camera sensor, the first camera 301 may be prevented from scanning the row q pixels of column 1 to column r, and begin sequentially scanning pixels from column r+1 to column s−1. The first camera 301 then may be prevented from scanning the row q pixels from column s to the last column of the first camera sensor.

In some example implementations, n, p, q, r, and s may be adjusted to compensate for changes in the overlapping field of capture, for different imaging applications or operating conditions, or other suitable factors for determining when to adjust which rows and columns to scan. For a fixed overlapping field of capture, n, p, q, r, and s may be stored and used during frame capture. In some other example implementations, n, p, q, r, and s may be determined as needed (such as before frame capture after adjusting one or more camera settings).

Further, if a row x of a second camera sensor corresponds to the row q of the first camera sensor, the device 300 may control the first camera 301 and the second camera 302 to scan the row q pixels from column r+1 to column s−1 of the first camera sensor concurrently with scanning the row x pixels of the second camera sensor. For example, the second camera 302 may begin scanning the first pixel of row x concurrently with the first camera 301 beginning to scan the column r+1 pixel of row q. In other examples, scanning of a row q pixel at column (r+s)/2 of the first camera sensor may be temporally aligned with scanning of a row x pixel at a center column of the second camera sensor, or scanning of a row q pixel at column s−1 of the first camera sensor may be temporally aligned with scanning of a row x pixel at a last column of the second camera sensor. Other suitable alignments may be used, and the present disclosure should not be limited to any specific example.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 306 in the example device 300 of FIG. 3) including instructions 308 that, when executed by the processor 304 (or the camera controller 310 or the image signal processor 312 or another suitable component), cause the device 300 to perform one or more of the methods described above. The non-transitory processor-readable data storage medium may form part of a computer program product, which may include packaging materials.

The non-transitory processor-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 304 or the image signal processor 312 in the example device 300 of FIG. 3. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, a camera may not be from a multiple camera system when performing one or more operations described in the present disclosure. For example, a device may include a single camera, and the frame capture rate of the single camera may be adjusted in placing the camera into and out of a low power mode. Additionally, the functions, steps or actions of the method claims in accordance with aspects described herein need not be performed in any particular order unless expressly stated otherwise. For example, the steps of the described example operations, if performed by the device 300, the camera controller 310, the processor 304, the image signal processor 312, one or both of the cameras 301 and 302, or another suitable component, may be performed in any order and at any frequency. Furthermore, although elements may be described or claimed in the singular, the plural is contemplated unless limitation to the singular is explicitly stated. For example, synchronizing frame capture may be performed for more than two cameras with overlapping fields of capture. Accordingly, the disclosure is not limited to the illustrated examples and any means for performing the functionality described herein are included in aspects of the disclosure.

What is claimed is:

1. A method for synchronizing captures by two cameras with different fields of capture, comprising:
for a first camera comprising a first camera sensor and a first rolling shutter for sequentially scanning pixels of the first camera sensor, preventing scanning pixels from a first row to a row n of the first camera sensor, wherein n is an integer greater than 1;
begin sequentially scanning pixels of the row n of the first camera sensor; and
begin sequentially scanning pixels of a first row of a second camera sensor of a second camera concurrently with beginning to sequentially scan pixels of the row n of the first camera sensor, wherein the second camera comprises a second rolling shutter for sequentially scanning pixels of the second camera sensor and the first row of the second camera sensor corresponds to a row within a predefined number of rows after the row n of the first camera sensor.

2. The method of claim 1, wherein the predefined number of rows is zero.

3. The method of claim 1, further comprising:
end sequentially scanning pixels of the first camera sensor at a row p of the first camera sensor, wherein p is an integer greater than or equal to n and a last row of the second camera sensor corresponds to a row within a predefined number of rows before the row p of the first camera sensor; and
preventing scanning pixels of the first camera sensor from a row p+1 to a last row of the first camera sensor.

4. The method of claim 3, further comprising:
scanning pixels of the first camera sensor of a row q of the first camera sensor, wherein q is an integer greater than n and less than or equal to row p, comprising:
preventing scanning pixels of the row q of the first camera sensor from a first column to a column r of the first camera sensor, wherein r is an integer greater than 1; and
begin sequentially scanning pixels of the row q of the first camera sensor at the column r of the first camera sensor, wherein a first column of the second camera sensor corresponds to a column within a predefined number of columns after the column r of the first camera sensor.

5. The method of claim 4, wherein scanning pixels of the row q of the first camera sensor further comprises:
end sequentially scanning pixels of the row q of the first camera sensor at a column s of the first camera sensor, wherein s is an integer greater than r and a last column of the second camera sensor corresponds to a column within a predefined number of columns before the column s of the first camera sensor.

6. The method of claim 5, further comprising:
scanning pixels of the second camera sensor at a row x of the second camera sensor concurrently with scanning pixels of the row q of the first camera sensor, wherein:
x is an integer greater than or equal to 1 and less than or equal to the number of rows of the second camera sensor; and
the row x of the second camera sensor corresponds to the row q of the first camera sensor.

7. The method of claim 6, wherein scanning pixels of the row x of the second camera sensor comprises:
begin sequentially scanning pixels at the first column of the row x of the second camera sensor concurrently with beginning to scan pixels at the column r of the row q of the first camera sensor.

8. The method of claim 7, wherein beginning to sequentially scan pixels at the first column of the row x of the second camera sensor comprise delaying the second rolling shutter in aligning beginning to sequentially scan pixels at the first column of the row x of the second camera sensor and beginning to sequentially scan pixels at the column r of the row q of the first camera sensor.

9. The method of claim 8, wherein preventing scanning pixels from the first row to the row n of the first camera sensor comprises:
scanning pixels from the first row to the row n of the first camera sensor; and
delaying beginning to sequentially scan pixels of the first row of the second camera sensor until after scanning pixels from the first row to the row n of the first camera sensor.

10. A device configured to synchronize captures by two cameras with different fields of capture, comprising:
a first camera with a first field of capture comprising a first camera sensor and a first rolling shutter for sequentially scanning pixels of the first camera sensor, wherein the first camera is configured to:
prevent scanning pixels from a first row to a row n of the first camera sensor, wherein n is an integer greater than 1; and
begin sequentially scanning pixels of the row n of the first camera sensor; and
a second camera with a second field of capture different than the first field of capture, the second camera comprising a second camera sensor and a second rolling shutter for sequentially scanning pixels of the second camera sensor, wherein the second camera is configured to:
begin sequentially scanning pixels of a first row of the second camera sensor concurrently with beginning to sequentially scan pixels of the row n of the first camera sensor, wherein the first row of the second camera sensor corresponds to a row within a predefined number of rows after the row n of the first camera sensor.

11. The device of claim 10, wherein the predefined number of rows is zero.

12. The device of claim 10, wherein the first camera is further configured to:
end sequentially scanning pixels of the first camera sensor at a row p of the first camera sensor, wherein p is an integer greater than or equal to n and a last row of the second camera sensor corresponds to a row within a predefined number of rows before the row p of the first camera sensor; and
prevent scanning pixels of the first camera sensor from a row p+1 to a last row of the first camera sensor.

13. The device of claim 12, wherein the first camera is further configured to:
scan pixels of the first camera sensor of a row q of the first camera sensor, wherein q is an integer greater than n and less than or equal to row p and scanning pixels of the row q of the first camera sensor comprises:
preventing scanning pixels of the row q of the first camera sensor from a first column to a column r of the first camera sensor, wherein r is an integer greater than 1; and begin sequentially scanning pixels of the row q of the first camera sensor at the column r of the first camera sensor, wherein a first column of the second camera sensor corresponds to a column within a predefined number of columns after the column r of the first camera sensor.

14. The device of claim 13, wherein scanning pixels of the row q of the first camera sensor further comprises:
end sequentially scanning pixels of the row q of the first camera sensor at a column s of the first camera sensor, wherein s is an integer greater than r and a last column of the second camera sensor corresponds to a column within a predefined number of columns before the column s of the first camera sensor.

15. The device of claim 14, wherein the second camera is further configured to:
scan pixels of the second camera sensor at a row x of the second camera sensor concurrently with scanning pixels of the row q of the first camera sensor, wherein:
x is an integer greater than or equal to 1 and less than or equal to the number of rows of the second camera sensor; and
the row x of the second camera sensor corresponds to the row q of the first camera sensor.

16. The device of claim 15, wherein scanning pixels of the row x of the second camera sensor comprises:
begin sequentially scanning pixels at the first column of the row x of the second camera sensor concurrently with beginning to scan pixels at the column r of the row q of the first camera sensor.

17. The device of claim 16, wherein the second camera is further configured to delay the second rolling shutter in aligning beginning to sequentially scan pixels at the first column of the row x of the second camera sensor and beginning to sequentially scan pixels at the column r of the row q of the first camera sensor.

18. The device of claim 17, wherein in preventing scanning pixels from the first row to the row n of the first camera sensor:
the first camera is configured to scan pixels from the first row to the row n of the first camera sensor; and
the second camera is configured to delay beginning to sequentially scan pixels of the first row of the second camera sensor until after the second camera scans pixels from the first row to the row n of the first camera sensor.

19. The device of claim 10, wherein the device is a wireless communication device further comprising:
one or more antennas; and
one or more transceivers coupled to the one or more antennas and configured to transmit and receive wireless communications via the one or more antennas.

20. A non-transitory computer-readable medium storing one or more programs containing instructions that, when executed by one or more processors of a device, cause the device to perform operations comprising:
for a first camera comprising a first camera sensor and a first rolling shutter for sequentially scanning pixels of the first camera sensor, preventing scanning pixels from a first row to a row n of the first camera sensor, wherein n is an integer greater than 1;
begin sequentially scanning pixels of the row n of the first camera sensor; and
begin sequentially scanning pixels of a first row of a second camera sensor of a second camera concurrently with beginning to sequentially scan pixels of the row n of the first camera sensor, wherein the second camera comprises a second rolling shutter for sequentially scanning pixels of the second camera sensor and the first row of the second camera sensor corresponds to a row within a predefined number of rows after the row n of the first camera sensor.

21. The non-transitory computer-readable medium of claim 20, wherein the predefined number of rows is zero.

22. The non-transitory computer-readable medium of claim 20, wherein execution of the instructions causes the device to perform operations further comprising:
end sequentially scanning pixels of the first camera sensor at a row p of the first camera sensor, wherein p is an integer greater than or equal to n and a last row of the second camera sensor corresponds to a row within a predefined number of rows before the row p of the first camera sensor; and
preventing scanning pixels of the first camera sensor from a row p+1 to a last row of the first camera sensor.

23. The non-transitory computer-readable medium of claim 22, wherein execution of the instructions causes the device to perform operations further comprising:
scanning pixels of the first camera sensor of a row q of the first camera sensor, wherein q is an integer greater than n and less than or equal to row p, comprising:
preventing scanning pixels of the row q of the first camera sensor from a first column to a column r of the first camera sensor, wherein r is an integer greater than 1; and
begin sequentially scanning pixels of the row q of the first camera sensor at the column r of the first camera sensor, wherein a first column of the second camera sensor corresponds to a column within a predefined number of columns after the column r of the first camera sensor.

24. The non-transitory computer-readable medium of claim 23, wherein execution of the instructions causes the device to perform operations further comprising:
end sequentially scanning pixels of the row q of the first camera sensor at a column s of the first camera sensor, wherein s is an integer greater than r and a last column of the second camera sensor corresponds to a column within a predefined number of columns before the column s of the first camera sensor.

25. The non-transitory computer-readable medium of claim 24, wherein execution of the instructions causes the device to perform operations further comprising:
scanning pixels of the second camera sensor at a row x of the second camera sensor concurrently with scanning pixels of the row q of the first camera sensor, wherein:
x is an integer greater than or equal to 1 and less than or equal to the number of rows of the second camera sensor; and
the row x of the second camera sensor corresponds to the row q of the first camera sensor.

26. The non-transitory computer-readable medium of claim 25, wherein execution of the instructions causes the device to perform operations further comprising:
begin sequentially scanning pixels at the first column of the row x of the second camera sensor concurrently with beginning to scan pixels at the column r of the row q of the first camera sensor.

27. The non-transitory computer-readable medium of claim 26, wherein execution of the instructions causes the device to perform operations further comprising:
delaying the second rolling shutter in aligning beginning to sequentially scan pixels at the first column of the row x of the second camera sensor and beginning to sequentially scan pixels at the column r of the row q of the first camera sensor.

\* \* \* \* \*